United States Patent [19]

Nelson

[11] Patent Number: 4,501,404
[45] Date of Patent: Feb. 26, 1985

[54] QUICK DISCONNECT ASSEMBLY

[75] Inventor: Alfred W. Nelson, Arlington, Tex.

[73] Assignee: Textron Inc., Providence, R.I.

[21] Appl. No.: 286,634

[22] Filed: Jul. 24, 1981

[51] Int. Cl.³ .......................................... F16M 13/00
[52] U.S. Cl. ................................................. 248/503.1
[58] Field of Search ...................... 248/501, 503, 503.1;
403/114, 115, 117, 124, 125, 141, 142, 321, 325;
410/106, 111, 116

[56] References Cited

U.S. PATENT DOCUMENTS

| | | | |
|---|---|---|---|
| 687,183 | 11/1901 | Kolander | 403/141 |
| 1,180,157 | 4/1916 | Lacey | 403/141 |
| 2,448,817 | 9/1948 | McArthur | 248/501 X |
| 2,614,781 | 10/1952 | Engel | 403/322 X |
| 2,676,045 | 4/1954 | Moskovitz | 403/125 |

FOREIGN PATENT DOCUMENTS

| | | | |
|---|---|---|---|
| 430713 | 6/1935 | United Kingdom | 403/325 |
| 605951 | 8/1948 | United Kingdom | 248/503.1 |

Primary Examiner—William H. Schultz
Attorney, Agent, or Firm—Richards, Harris, Medlock & Andrews

[57] ABSTRACT

A quick disconnect assembly (20) provides for the releasable attachment of a fixture, such as a helicopter seat frame (26), to a support structure, such as the interior structure of the aircraft cabin (28). The assembly includes a tie down stud (100) having a substantially spherical outer surface (182) and a threaded bolt (188) extending therefrom for attachment to the support structure. An attachment fitting (22) is provided having a main body (40) with means for attachment (56) to the fixture. A plurality of grip arms (148) are pivotally associated with the main body. The arms have inwardly curved ends (156) for cooperating with the spherical outer surface of the stud to engage the stud by positioning the arms inwardly. With the attachment fittings secured to the tie down stud, the attachment fitting is movable relative to the stud through a predetermined angle.

10 Claims, 8 Drawing Figures

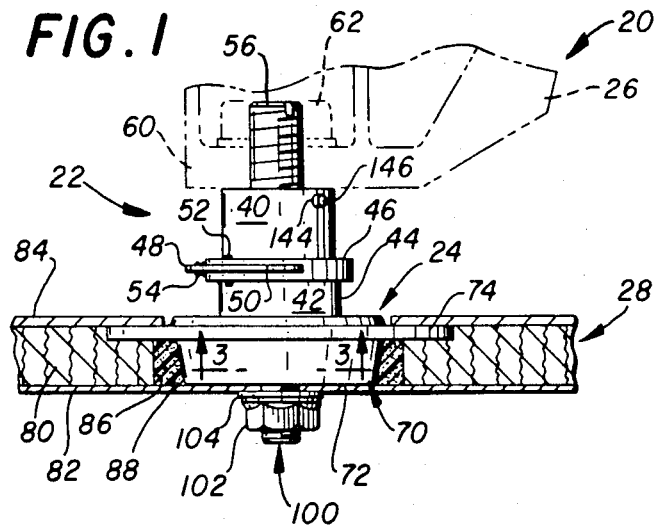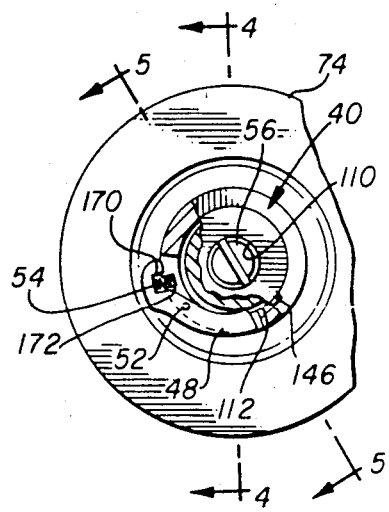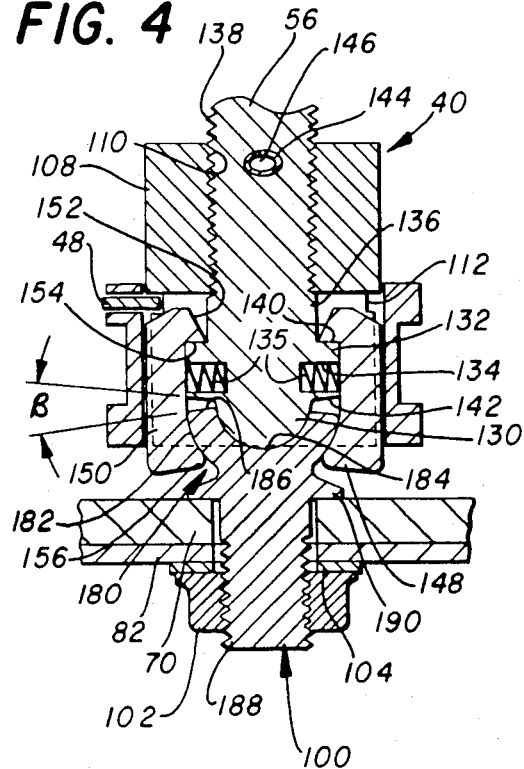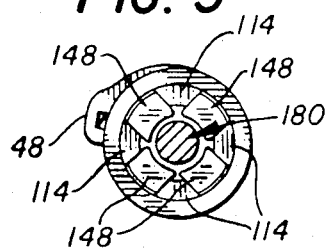

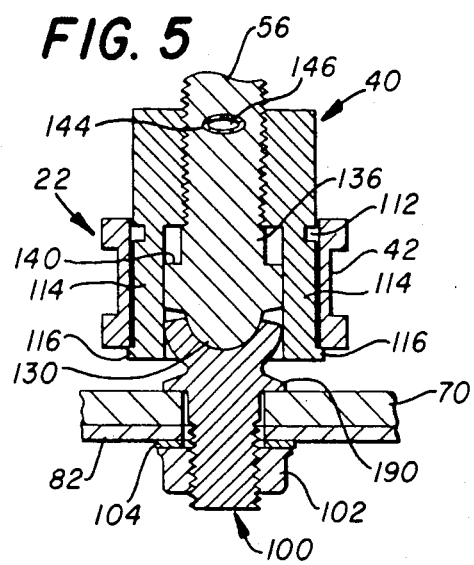
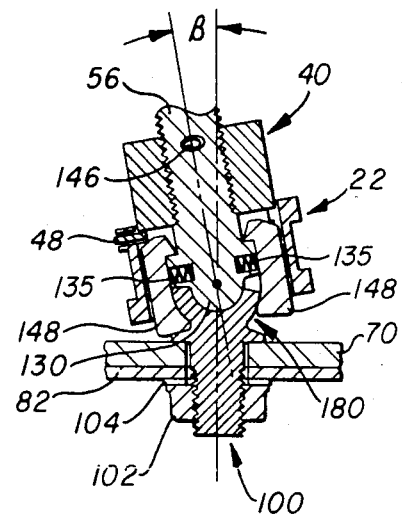
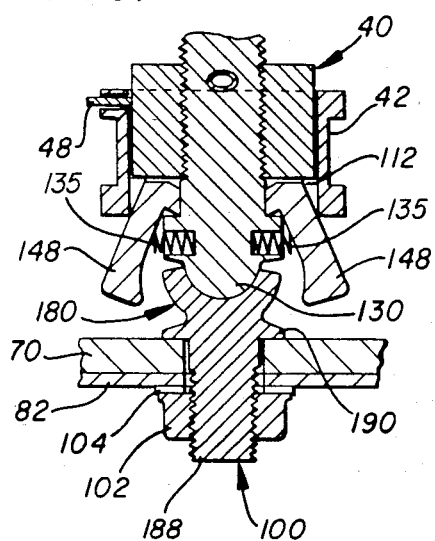
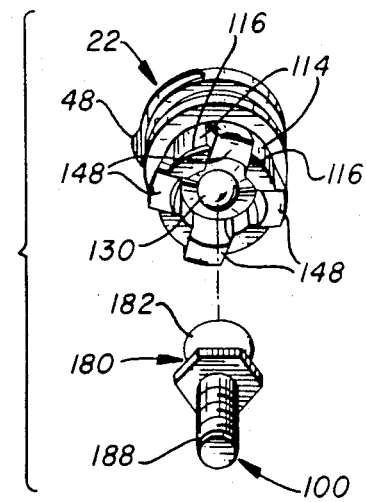

QUICK DISCONNECT ASSEMBLY

TECHNICAL FIELD

The present invention relates to a quick disconnect assembly and more particularly to such an assembly which permits nonload inducing angular movement between components of the assembly.

BACKGROUND ART

Some aircraft cabin interior structures are attached to the fuselage structure by quick disconnect attachment fittings. For example, pilot and passenger seats in many helicopters, as well as in other types of aircraft, are attached to the fuselage structure using a quick disconnect assembly. This permits the easy installation and removal of seats when repair or removal of fuselage components or the seats is required.

While such attachment fittings have provided for quick removal and installation of these components, the connection has generally provided a rigid attachment between the fuselage structure and the seat frame. As a result, in the event of a helicopter crash, relative movement between the fuselage structure to which the seat is attached and the seat frame itself induces substantial bending or prying forces. These forces can result in the failure of the attachment assembly and thereby permit the release of the seat from the fuselage structure. In the event the seat becomes disengaged from its attachment to the fuselage, the safety of the passengers or pilot is greatly jeopardized.

DISCLOSURE OF THE INVENTION

The present invention recognizes the benefit which is derived from providing a quick disconnect attachment between the fuselage structure and components such as pilot and passenger seats which would permit relative movement between the fuselage structure and the seat frame without inducing bending or prying forces at the point of attachment. The quick disconnect assembly according to the present invention provides for the releasable attachment of a fixture, such as a helicopter seat frame, to a support structure, such as the interior structure of the aircraft cabin. The assembly includes a tie down stud having a substantially spherical outer surface and structure for attachment of the stud to the support structure. An attachment fitting is provided having a main body with means for attachment to the fixture and a plurality of grip arms pivotally associated with the main body. The arms have inwardly curved ends for cooperating with the spherical outer surface of the stud to engage the stud by positioning the arms inwardly. Even though engaged with the stud, the main body is movable relative to the stud through a predetermined angle. In a preferred embodiment of the invention, the main body is movable through an angle of approximately 10° from alignment with the stud. While this particular angular movement is identified in the preferred embodiment of being on the order of 10°, it will be appreciated by those skilled in the art that a lesser or greater degree of movement can be provided without departing from the spirit of the present invention.

In accordance with a more specific embodiment of the invention, the main body has a spherical head extending therefrom and the tie down stud has a spherical indention formed therein for receiving the spherical head. A substantially uniform thickness wall is formed between the spherical surface and the indention.

The main body includes a cylindrical shaft having an annular flange extending radially outwardly from the shaft with the spherical head extending from the end of the shaft adjacent the flange. The grip arms have an engaging lip on one end thereof spaced from the inwardly curved ends for engaging the flange. Springs are positioned between the stud and the arms for normally urging the arms radially outwardly. A locking sleeve is engaged around the gripping arms and is movable between a first position wherein the gripping arms are spread outwardly under the action of the springs and a second position wherein the gripping arms are positioned inwardly for engagement adjacent to the tie down stud. Upon engagement of the spherical head within the spherical indention of the stud, appropriate clearance is provided between the upper uniform thickness wall of the tie down stud and the flange formed on the main body to permit angular rotation of the main body relative to the stud. As a result of this geometry, a ten degree movement of the cabin structure relative to the seat frame structure can occur without introducing bending forces between the tie down stud and the quick disconnect main body.

BRIEF DESCRIPTION OF THE DRAWINGS

For a more complete understanding of the present invention, and for further details and advantages thereof, reference is now made to the following description taken in conjunction with the accompanying drawings, in which:

FIG. 1 is a partially broken away side plan view of the quick disconnect assembly according to the present invention;

FIG. 2 is a partially broken way top plan view thereof;

FIG. 3 is a section view taken along line 3—3 of FIG. 1;

FIG. 4 is an enlarged section view taken along line 4—4 of FIG. 2;

FIG. 5 is a section view taken along line 5—5 of FIG. 2;

FIG. 6 is a section view similar to FIG. 4 but showing the main body canted relative to the tie down stud;

FIG. 7 is a vertical section view of the quick disconnect assembly showing the main body released from the tie down stud; and FIG. 8 is a perspective view of the quick disconnect assembly with the main body separated from the tie down stud.

DETAILED DESCRIPTION

Referring to FIG. 1, a quick disconnect assembly 20 includes a main body assembly 22 for releasable attachment to a floor attachment assembly 24. In the embodiment illustrated, quick disconnect assembly 20 is used for attachment of a seat leg 26 to the cabin floor panel 28 of an aircraft, such as a helicopter.

Main body assembly 22 includes a main body 40 having a lock sleeve 42 slidably engaged over body 40. As will be described hereinafter in greater detail, sleeve 42 is movable longitudinally relative to body 40. Sleeve 42 has a shank portion 44 with an annular flange 46 formed at one end thereof. A lock arm 48 operates in an annular groove 50 formed in flange 46. Lock arm 48 is pinned to flange 46 by pin 52 and is biased by a compression spring 54 entrapped between one end of lock arm 48 and flange 46. A connecting bolt 56 is threadedly received within main body 40. Main body assembly 22 is connected to seat leg 26 by positioning bolt 56 through an aperture in lower flange 60 of seat leg 26 and engaging a nut 62 thereon to fix main body assembly 22 to flange 60.

Floor attachment assembly 24 includes a dish-shaped floor fitting 70 consisting of a circular dish body 72 with a flange 74 extending therefrom. Floor fitting 70 is permanently secured to floor panel 28, the fitting being attached into the floor panel upon its construction. As is seen in FIG. 1, floor panel 28 includes a central core 80 between a lower skin 82 and an upper skin 84. The panel is originally formed with a circular cutout 86 in core 80 somewhat larger than the diameter of dish body 72. Floor fitting 70 is then affixed within the circular cutout using an appropriate adhesive 88 with the bottom of the floor fitting resting against lower skin 82. Flange 74 is positioned immediately below upper skin 84 as shown. In this way, floor fitting 70 is permanently fixed within the floor panel 28.

Floor attachment assembly 24 includes a tie down stud 100 which is attached to floor fitting 70 and lower skin 82 of floor panel 28 using an appropriate nut 102. A washer 104 is positioned between nut 102 and lower skin 82 as shown.

Referring now to FIGS. 2 through 5 and particularly FIGS. 3 through 5, main body 40 has an upper body portion 108 with an internal thread 110 formed longitudinally therethrough for receiving threaded bolt 56. Main body 40 has an intermdiate annular locking groove 112 formed around the entire circumference of the main body with four fixed legs 114 (FIG. 5) extending from upper portion 108. An outturned angular lip 116 (FIG. 5) is formed on the end of legs 114 remote from body portion 108.

Referring to FIG. 4, bolt 56 has a spherical end 130 leading to an annular flange 132 having a plurality of cylindrical spring receiving countersunk holes 134 formed therein. Opposite the spherical end 130 from flange 132 is an unthreaded shaft portion 136 leading to a threaded end 138. Referring now to annular flange 132, a ledge 140 is formed by flange 132 opposite spherical end 130. Surface 142 of flange 132, adjacent the spherical end, is angled upwardly from the spherical end as shown.

An aperture 144 is formed in the threaded end of shaft portion 136 and receives a spring pin 146 therethrough to fix bolt 56 relative to main body 40.

Grip arms 148 cooperate with bolt 56 to engage tie down stud 100 as will hereinafter be described. Grip arms 148 include uniform central portion 150 having an engaging foot 152 on one end defining a step 154. The end opposite foot 152 has a radially inwardly facing curved lower portion 156. As is seen in FIG. 4, with lock sleeve 42 engaged downwardly over grip arms 148, the arms are engaged inwardly against the outwardly facing surface of flange 132 compressing springs 135 received within countersunk holes 134. In this engaged position, the radius of curvature of the lower portion 156 of arms 148 has approximately the same center as the radius of curvature of spherical end 130 of bolt 56. Further, step 154 on grip arms 148 is engaged with ledge 140 of flange 132.

As can be seen in FIGS. 2 and 4, lock arm 48 has a notch 170 in one end thereof for receiving one end of spring 54. The opposite end of spring 54 is received in a countersunk bore 172 formed in upper flange 46 of sleeve 42. Spring 54 acts to bias lock arm 48 about pin 52 engaging the end opposite notch 170 against main body 40. When sleeve 42 is in the position shown in FIG. 4 such that lock arm 48 registers with annular locking groove 112, the lock arm is engaged within groove 112, and prevents the sliding movement of the lock sleeve. Disengagement of the lock arm is achieved by depressing lock arm 48 adjacent notch 170 to compress spring 54, causing the disengagement of the opposite end of lock arm 48 from the annular locking groove 112.

Referring to FIGS. 3 and 4, tie down stud 100 includes a spherical head 180 having a spherical outer surface 182 and a spherical indention 184 with an upper flat 186 joining the two. A threaded bolt 188 extends from spherical head 180 with a positioning collar 190 therebetween. As can be seen in FIG. 4, a spherical wall of substantial uniform thickness is formed between spherical outer surface 182 and spherical indention 144 of head 180. As has been described above, stud 100 is attached to floor fitting 70 and lower skin 82 of floor panels 28 by nut 102.

As can be seen in FIG. 4, the upper flat 186 between spherical outer surface 182 and spherical indention 184 of head 180 slopes downwardly from indention 184 to spherical surface 182. As is shown in FIG. 4, with main body 40 aligned with stud 100, the angular position between this flat 186 and end 142 on bolt 56 is defined by the angle $\beta$. In a preferred embodiment, this angle is on the order of 10°.

Referring to FIG. 6, with lock sleeve 42 engaged in the lock position as illustrated in FIGS. 1–6, such that grip arms 148 are engaged inwardly adjacent spherical head 180 of stud 100, bolt 56 may still be rotated through the angle $\beta$ relative to stud 100 without inducing bending forces between the two components. In effect, seat leg 26 may then be rotated through a 10° arc relative to floor panel 28 without introducing any bending forces in the quick disconnect assembly.

Disconnection of main body 40 from tie down stud 100 is illustrated in FIGS. 7 and 8. Release is quickly and easily achieved by depressing lock arm 48 to compress spring 54 (FIG. 2), thereby disengaging the lock arm from annular locking groove 112. Sleeve 42 is then slid longitudinally along main body 40 upwardly as seen in FIG. 7. Upon upward movement of sleeve 42, grip arms 148 swing outwardly under the action of springs 135 releasing engagement with spherical head 180. As is seen in the perspective view of FIG. 8, the release of grip arms 148 permits the disengagement of main body assembly 22 from tie down stud 100.

Thus, the present invention provides for a quick disconnect assembly for releasably attaching a component such as the pilot or passenger seat frame to the aircraft cabin floor structure. In the connected position, the present invention permits movement of the seat frame relative to the cabin interior structure without inducing bending forces on the quick disconnect assembly. It will be appreciated that the movement permitted between the main body assembly and the tie down spherical head stud permits a movement from axial alignment in any direction to a maximum canted position. In the embodiment disclosed, the movement permitted is on the order of 10° from axial alignment.

Although preferred embodiments of the invention have been described in the foregoing detailed description and illustrated in the accompanying drawings, it will be understood that the invention is not limited to the embodiments disclosed, but is capable of numerous rearrangements, modifications and substitutions of parts and elements without departing from the spirit of the invention. Accordingly, the present invention is intended to encompass such rearrangements, modifications and substitutions of parts and elements as fall within the spirit and scope of the invention.

I claim:

1. A quick disconnect assembly for releasably attaching a fixture to a support structure comprising:

a tie down stud having a substantially spherical outer surface and means for attachment of said stud to the support structure, and an attachment fitting having a main body fixed to the fixture and a plurality of grip arms pivotally associated therewith, said arms having inwardly curved ends for cooperating with the spherical outer surface of said stud upon engagement of said arms inwardly, said grip arms and said stud permitting the angular movement of the main body relative to the stud by a predetermined angle, said main body comprising a spherical head extending from one end thereof, and said tie down stud comprising a spherical indention formed therein for receiving said spherical head.

2. The assembly according to claim 1 wherein said predetermined angle is approximately 10°.

3. The assembly according to claim 1 wherein said stud has a spherical indention therein to form a substantially uniform thickness spherical wall, and wherein said main body further has a spherical head extending therefrom for engagement within said spherical indention.

4. The assembly according to claim 3 wherein upon engagement of said spherical head within said spherical indention of said stud and with the gripping arms engaged adjacent thereto, clearance is provided between the upper edge of the uniform thickness wall of the tie down stud and the flange formed on the main body to permit angular movement of the main body relative to the stud.

5. The assembly according to claim 3 wherein the depth of said indention is less than the height of said spherical head on said stud.

6. The assembly according to claim 1 wherein said main body includes:

a cylindrical shaft, an annular flange extending radially outwardly from said shaft, and a spherical head extending from the end of said shaft adjacent said flange, and wherein said grip arms have an engaging lip on one end thereof spaced from the inwardly curved ends for engaging said flange, spring means positioned between said main body and said arms for normally urging said arms radially outwardly, and a locking sleeve engaged around said gripping arms and movable between a first position wherein said gripping arms are spread outwardly and a second position wherein said gripping arms are engaged inwardly adjacent said tie down stud.

7. A quick disconnect assembly comprising:

a tie down stud comprising a substantially spherical outer surface, an attachment fitting comprising a main body with a plurality of grip arms pivotally associated therewith, said arms having inwardly curved ends thereon, and means for positioning said arms with the curved ends thereof adjacent the spherical outer surface of said tie down stud to secure said attachment fitting to said stud while permitting angular movement of the main body through a predetermined angle relative to the stud, said main body comprising a spherical head extending from one end thereof, and said tie down stud comprising a spherical indention formed therein for receiving said spherical head.

8. The assembly according to claim 7 wherein said predetermined angle is approximately 10°.

9. The assembly according to claim 7 wherein the depth of said indention is less than the height of said spherical head on said stud.

10. A quick disconnect assembly comprising:

a tie down stud consisting substantially of a half sphere having a spherical indention formed therein to define a substantially uniform thickness spherical wall and means for attaching said half sphere opposite said indention to support structure, and a main body having a spherical head extending from one end thereof and a plurality of grip arms pivotal relative to the main body, said arms having inwardly curved ends for cooperating with the spherical head of said main body for engaging said tie down stud by insertion of said spherical head into the spherical indention of said stud and engaging said arms inwardly toward the spherical wall of said stud, the engagement of the grip arms around the stud permitting the angular movement of the main body through a predetermined angle relative to the stud.

* * * * *